V. W. BALZER AND J. McK. BALLOU.
INTERNAL COMBUSTION ENGINE.
APPLICATION FILED AUG. 11, 1920.
1,376,133.
Patented Apr. 26, 1921.
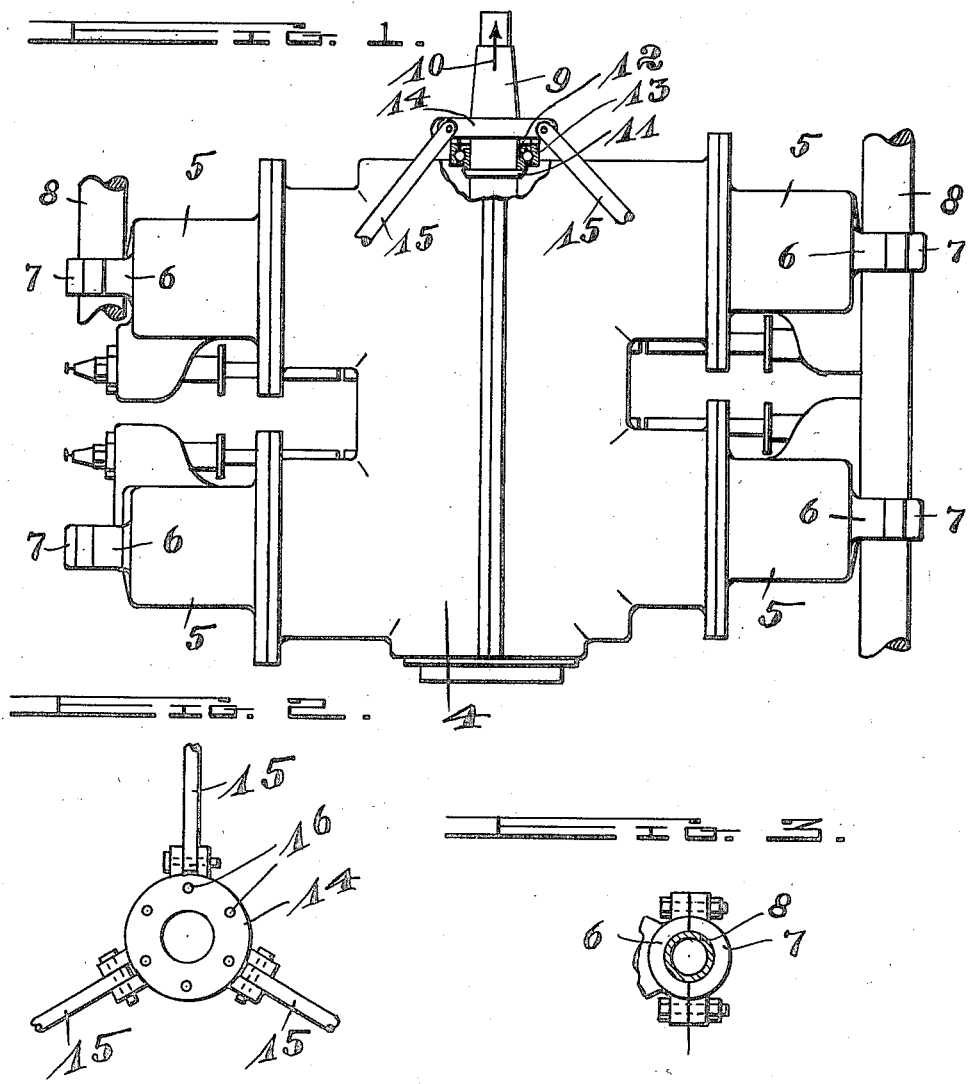
INVENTORS:
Vernon W. Balzer
John McK. Ballou.

UNITED STATES PATENT OFFICE.

VERNON W. BALZER AND JOHN McK. BALLOU, OF LOS ANGELES, CALIFORNIA, ASSIGNORS TO WESTERN AIRCRAFT CORPORATION, INC., OF LOS ANGELES, CALIFORNIA.

INTERNAL-COMBUSTION ENGINE.

1,376,133. Specification of Letters Patent. Patented Apr. 26, 1921.

Application filed August 11, 1920. Serial No. 402,836.

*To all whom it may concern:*

Be it known that we, VERNON W. BALZER and JOHN McK. BALLOU, citizens of the United States, residing at Los Angeles, in the county of Los Angeles and State of California, have invented new and useful Improvements in Internal-Combustion Engines, of which the following is a specification.

This invention relates to devices for attaching, supporting, stabilizing, and otherwise mounting operating-motors in flying-machines.

One of the objects of this invention is to provide such means whereby such operating-motors are so mounted without influencing the stresses in the structure of such flying machine in any other manner than predetermined.

Another object is to provide supporting means on such motors by which the motors can be mounted on the frame work of flying machines.

Another object is to provide means by which the end-thrust of the propeller of a flying machine is taken care of directly without going through the machine and through the supporting points of the machine into the frame work of the flying machine.

Another object is to provide ball or similar bearings for such end-thrust to receive the end-thrust directly, being provided with independent connecting means for transmitting such end-thrust directly to predetermined points in the frame work of the flying machine.

Other objects will appear from the following description and appended claims as well as from the accompanying drawing, in which—

Figure 1 is a top plan view of a motor with our devices in proper places.

Fig. 2 is an end elevation of the thrust bearing of our device with broken-off portions of the connecting rods.

Fig. 3 is a fragmentary detail end elevation of a supporting and connecting lug for such motor to engage with the frame work of a flying machine.

The motor 4 in the drawing is provided with four cylinders 5. The head of each of these cylinders 5 is provided with a lug 6. A cover plate 7 is provided for each of the lugs 6 on the cylinders 5, so that a bearing is formed between each lug and the corresponding cover plate. Since such bearings are made of halves, it is naturally made easy to adjust the seating and gripping of such bearings in relation to such bars 8 (as to which or on which such bearings are mounted) in such a manner that the motor may be able to slide on such bars 8.

The bars 8 are normally a portion of the frame work of a flying machine, and it is naturally desirable that all stresses in every member of the structure of such flying machine are ascertainable, and possibly not influenced by the working of the motor during the operation of such flying machine.

Adjusting such bearings so as to eventually slide on the bars 8 would make it certain that no other stresses could influence such bars through the motor but the weight of such motor, since the end-thrust of the propeller of the motor is taken care of at another point, as will be more fully described hereafter.

The shaft end 9 is provided for the propeller.

Assuming now that such propeller is mounted on the shaft in such a manner and conditioned so as to cause the developing of an end-thrust in the direction indicated by the arrow 10 during the normal operating of the motor, the shoulder ring 11, provided on the shaft would then naturally be taken up by the thrust bearing disposed in front of the motor. Following this design, one member 12 of a ball bearing is made to engage the shoulder ring 11 of the driving shaft of the motor, while the opposite member 13 of the same ball bearing is made to engage with the thrust ring 14. The thrust ring 14 is provided with a suitable number of connecting rods 15 to be connected to suitable points of the flying machine, three such rods being only shown but it will easily be understood that any number of such rods can be provided to transmit such end thrust of the propeller to so many points of the wings that a proper receiving of such end-thrust is assured according to the bearing facility of a plane or flying machine.

Such end-thrust is then distributed from one point of the shaft, that is exactly from such point of the shaft where such end thrust is received from the propeller, without causing or allowing any unnecessary stress to go through any part of the motor. The whole motor is then naturally subject to stresses developed in itself and by its own force only, while the varying forces and vibrations of the propeller are transmitted mainly to a suitable number of points in the structure of the flying machine, which may then fairly well be braced accordingly, as will easily be understood.

The thrust ring 14 is preferably provided with a number of holes 16 for bolts to locate the thrust bearing on the motor, but preferably not for taking up any of the end thrusts or stresses, as will easily be understood without further explanation.

Only short portions of the connecting rods have been illustrated in the drawing, and no parts of a flying machine to which such connecting rods are connected, but such will easily be understood without detail illustration, since no particular points of the flying machine are claimed for such connection.

Having thus described our invention, we claim:

1. In an internal combustion engine, lugs provided on the heads of the cylinders, and cover plates of a form corresponding to the lugs forming with such lugs adjustable supporting means for slidingly supporting the engine.

2. In an internal combustion engine, in combination with the cylinders and the shaft of such engine, a thrust bearing provided on the shaft having bracing means for receiving and withstanding the end-thrust of such shaft so that such end-thrust is not transmitted to the engine, and lugs on the cylinders of the engine having means for supporting the engine so that the end-thrust can be taken up by such thrust bearing.

3. In an internal combustion engine, in combination with the cylinders and the shaft of such engine, a thrust bearing provided on the shaft having bracing means for receiving and withstanding the end-thrust of such shaft so that such end-thrust is not transmitted through the engine itself, lugs on the cylinders of the engine having means for supporting the engine so that the end-thrust can be taken up by such thrust bearing, and cover plates for such lugs forming with the lugs supporting means for adjustably and slidingly supporting the engine.

4. In an internal combustion engine, in combination with the cylinders and shaft of such engine for use in flying machines, a thrust bearing provided on the shaft having bracing means for receiving and withstanding the end-thrust of such shaft to be transmitted directly from such shaft through the said bearing to the frame work of such flying machines, lugs on the cylinders of the engine having means for supporting the engine so as to allow the thrust bearing to receive and transmit the end-thrust from a propeller of such flying machine directly to the frame work of the flying machine without influencing the engine.

In testimony that we claim the foregoing as our invention we have signed our names in the presence of two subscribing witnesses.

VERNON W. BALZER.
JOHN McK. BALLOU.

Witnesses:
J. E. BOHLINGER,
G. V. DAVIDSON.